Jan. 11, 1966 W. E. HANSON ETAL 3,229,278

TIME CODE GENERATOR

Filed Dec. 10, 1962 3 Sheets-Sheet 1

EDGAR H. FISCHER
WALTER E. HANSON
INVENTORS

BY Claude Funkhouser
ATTORNEY

EDGAR H. FISCHER
WALTER E. HANSON
INVENTORS

BY Claude Funkhouser
ATTORNEY

EDGAR H. FISCHER
WALTER E. HANSON
INVENTORS

BY Claude Funkhouser
ATTORNEY

United States Patent Office 3,229,278
Patented Jan. 11, 1966

3,229,278
TIME CODE GENERATOR
Walter E. Hanson, Elkridge, and Edgar H. Fischer, Silver Spring, Md., assignors to the United States of America as represented by the Secretary of the Navy
Filed Dec. 10, 1962, Ser. No. 243,679
10 Claims. (Cl. 340—347)

This invention relates in general to timing devices and more particularly to a novel time code generator.

Prior art time code generators are restricted in commercial application due to their lack of accuracy and their high cost. In addition, these generators are primarily electronic in nature depending in their operation upon elaborate counters and logic circuits.

The present invention provides a time code generator that gives a continuous time of day electronic signal in analog code. The invention is accurate and inexpensive and may be used in any application where it is required to establish the time in code at which specific events occur. The principle employed by the invention is based upon the systematic illumination of photo resistors or diodes which are used as light sensors in a time gear generator.

It is an object of the present invention to provide a time code generator which is both inexpensive to manufacture and accurate in operation.

It is another object of the present invention to provide a time code generator in which the generated code can be quickly and easily changed.

It is a further object of the present invention to provide a time code generator utilizing photo-diode sensors for detecting the time code.

It is still another object of the invention to provide a time code generator in which possible ambiguities in the generated code are eliminated through the use of strobing techniques.

Other objects and many of the attendant advantages of this invention will be readily appreciated as the same becomes better understood by reference to the following detailed description when considered in connection with the accompanying drawings, wherein.

The embodiment of the invention described and illustrated is a code generator built to generate a 13-bit, one pulse per second, binary time code. It is however to be understood that the binary code was chosen only by way of example and that the invention is not restricted to the use of such code, as will be explained more fully hereinafter.

Figure 1:
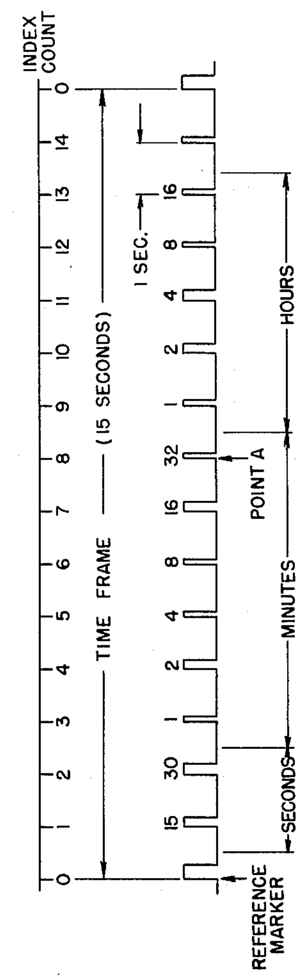
FIG. 1 is a schematic representation of one form of coded output available from the invention.

FIG. 1 shows the format of a 13-bit binary code which may be used in the illustrated embodiment of the invention. The time frame for the code is 15 seconds with the individual bits occurring at a 1 pulse per second rate. Reference markers of 300 milliseconds duration occur once each 15 seconds. The 1 second spaced "0" digits are 60 milliseconds in duration with the presence of a code digit indicated by widening the "0" digits to 160 milliseconds. By way of example, the pulse representation in FIG. 1 has been coded so that the time at point A reads 6 hours, 18 minutes, and 53 seconds. Pulses numbered one and two plus the number of the pulse at which time is taken indicate the seconds portion; while pulses three through eight indicate the minutes portion and pulses nine through thirteen indicate the hours portion of the time.

Figure 2:
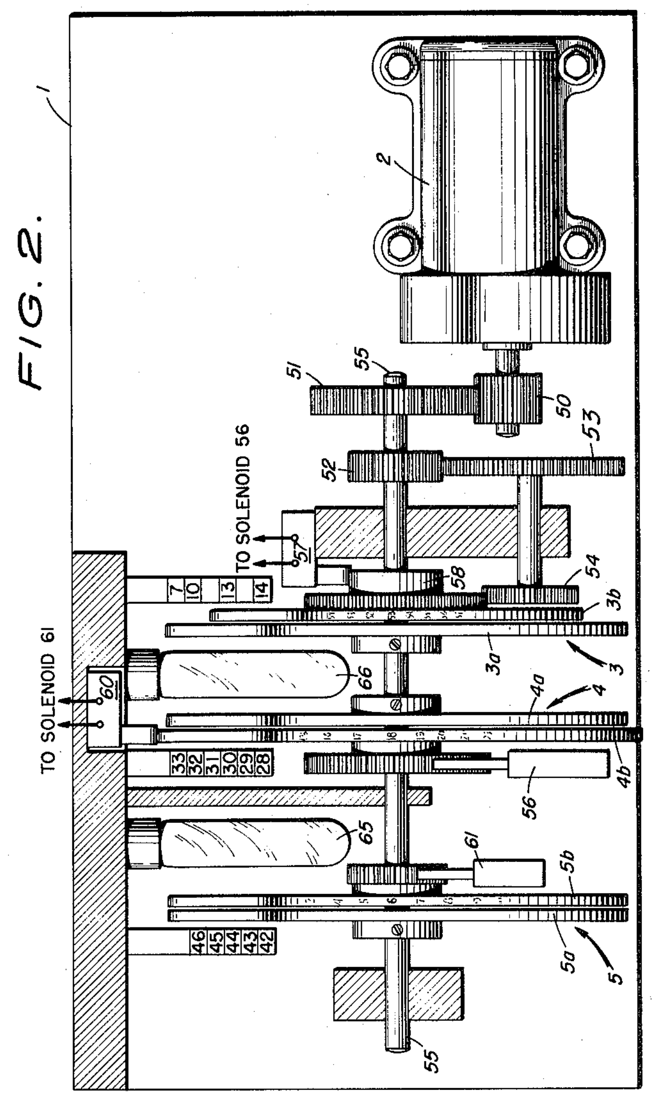
FIG. 2 is a top plan view of one embodiment of the time code generator constructed according to the invention.

The timing generator 1 according to the invention is shown in FIG. 2. The accuracy of the system depends on a synchronous motor 2 which may be driven from the normal 60 cycle line frequency and power as an electric clock is driven, by a tuning fork and power amplifier or by a piezoelectric crystal and power amplifier. The choice would depend on accuracy requirements, cost, availability, etc.

Figure 3:
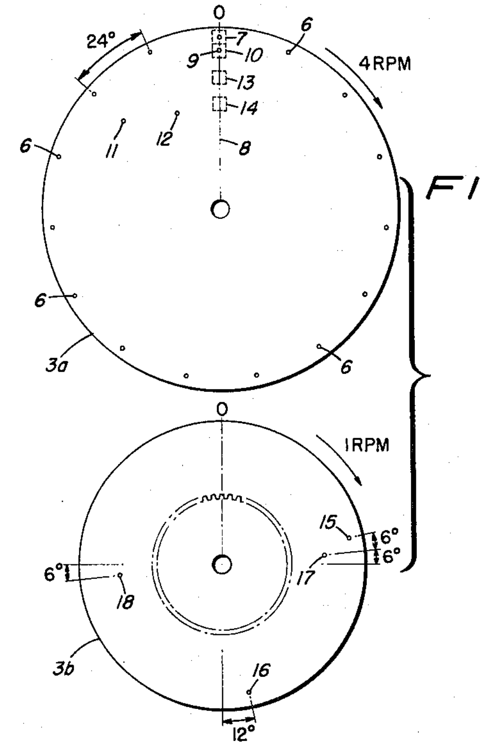
FIGS. 3–5 are representations of the time discs used in the device of FIG. 2.

The coded readout is accomplished through timed rotation of three pairs of discs 3, 4 and 5 which have holes drilled therein in appropriate binary relationship. The first pair of discs 3*a* and 3*b* for producing the "seconds" portion of the coded time output is shown in FIG. 3. The readout disc 3*a* contains an outer circle of holes 6 which are so spaced that one hole will pass photodiode 7 at reference line 8 each second, thereby providing the required one second rate output pulses shown in FIG. 2. Within the circle of holes 6 is provided a hole 9 shown opposite photodiode 10. Hole 9 passes reference line 8 and photodiode 10 every 15 seconds, providing the required reference marker. In order to produce a "seconds" code output the code disc 3*b* contains the holes 15 and 17, 16, and 18, which provide a 45, 30, and 15 "second" output, respectively, at the photodiodes 13 and 14. Readout disc 3*a* contains a pair of holes 11 and 12 which strobe the holes 15, 16, 17 and 18 in the code disc 3*b*, and thereby cause the photodiodes 13 and 14 to be selectively illuminated with great precision.

Figure 4:
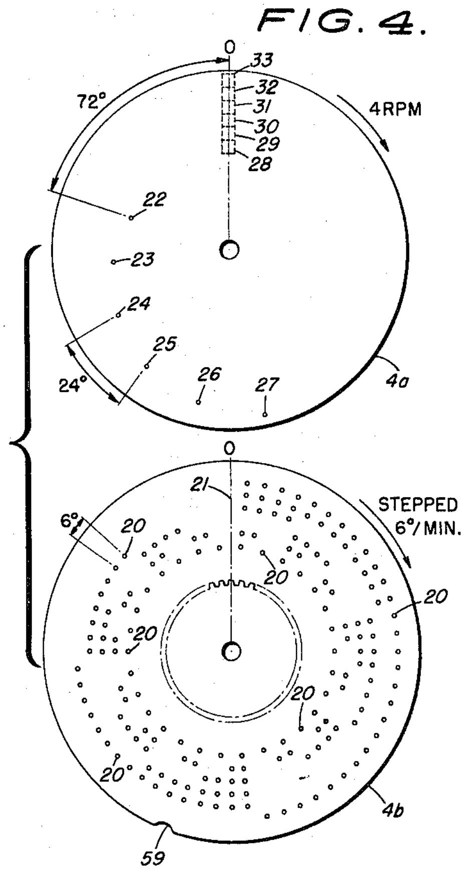

The second pair of discs 4 comprises a minutes readout disc 4*a* and a minutes code disc 4*b*, as shown in FIG. 4. Holes 20 are drilled in the minutes code disc 4*b* in six concentric circles with binary coding up to and including the number 59. The position for number 60 coincides with the reference line 21. The readout disc 4*a* contains holes 22, 23, 24, 25, 26 and 27 for strobing the 1, 2, 4, 8, 16 and 32 minute photodiodes 28, 29, 30, 31, 32 and 33, respectively.

Figure 5:
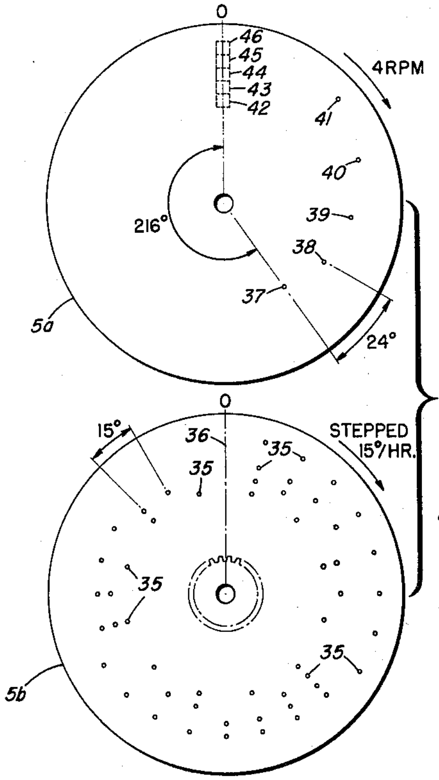
Figure 6:
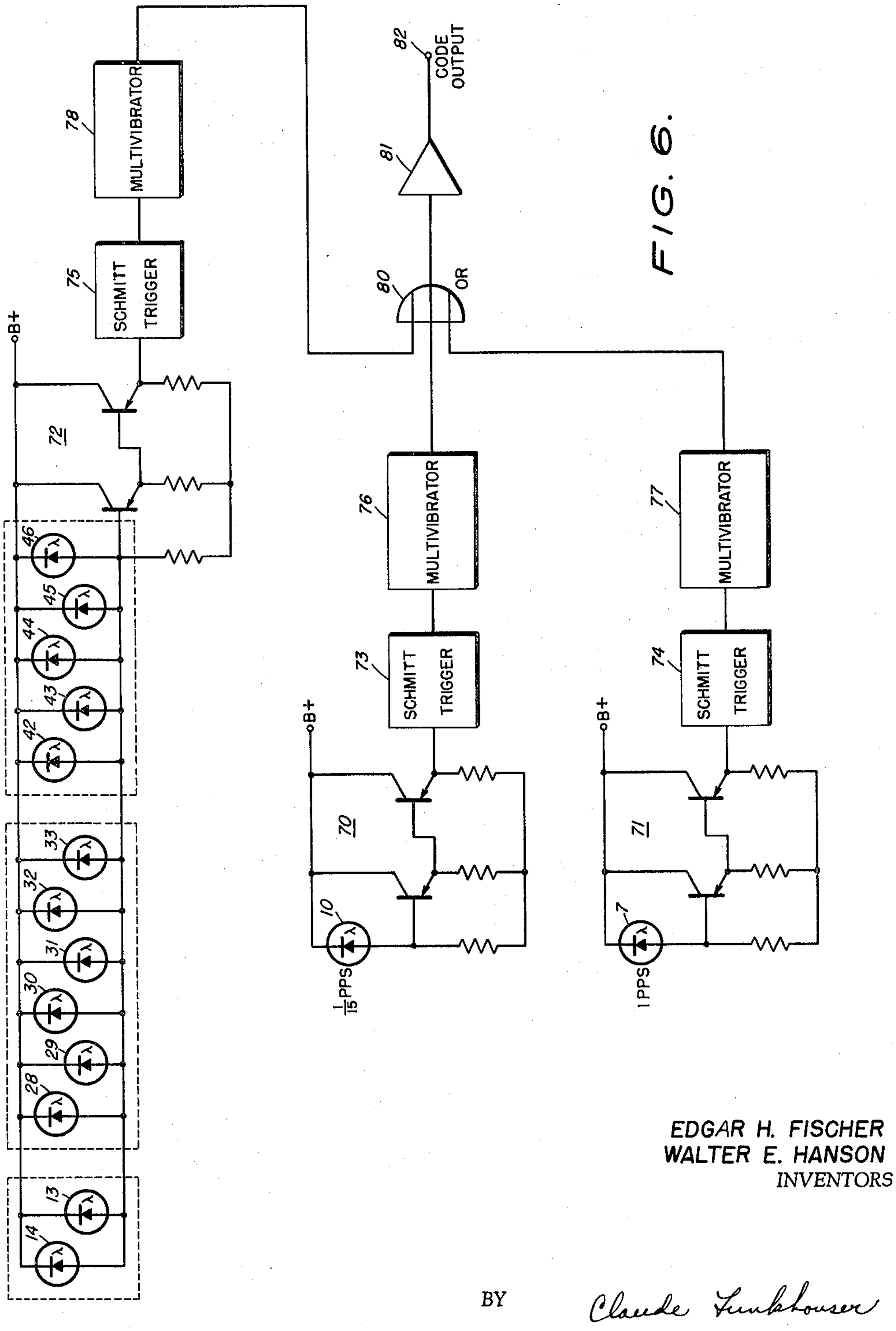
FIG. 6 is a schematic representation of the output detection circuitry used in conjunction with the device of FIG. 2.

The third pair of discs 5 comprises an hours readout disc 5*a* and an hours code disc 5*b*, as shown in FIG. 5. The hours code disc 5*b* has holes 35 drilled in five concentric circles with binary coding up to and including the number 23 with number 24 occurring at reference line 36. The readout disc 5*a* contains holes 37, 38, 39, 40 and 41 for strobing the 1, 2, 4, 8 and 16 hour photodiodes 42, 43, 44, 45 and 46, respectively.

The three readout discs 3*a*, 4*a* and 5*a* are attached to the same shaft, rotating at 4 r.p.m., and are locked in the proper position so that all of the code bits are in the proper position in the time frame.

The device for positioning the various discs with time is shown in FIG. 2. The motor 2 drives the seconds code disc 3*b* through an appropriate reduction gear mechanism, consisting of gears 50, 51, 52, 53 and 54, at 1 revolution per minute. The three readout discs 3*a*, 4*a* and 5*a* are connected to a common shaft 55 and revolve at four r.p.m. The minutes code disc 4*b* is stepped 6° per step by means of a solenoid 56 which receives an appropriate signal from a switch 57 operated by a cam 58 attached to the seconds code disc 3*b*. Since the seconds code disc 3*b* operates at 1 r.p.m., the minutes code disc 4*b* is stepped one step each minute. One complete revolution of the minutes code disc 4*b* is achieved in 60 steps; therefore, each revolution of this disc is completed in one hour. The edge of the minutes code disc 4*b* has a cam surface 59, shown in FIG. 4, for operating a switch 60 which activates a solenoid 61. The solenoid 61 advances the hours code disc 5*b* every 60 minutes by 15°, thereby rotating the disc through 24 positions in one day.

As already mentioned time code sensing is accomplished by the use of photodiodes. A pair of light sources consisting of two linear filament light bulbs 65 and 66 are supported between the pairs of discs as shown in FIG. 2. The bulb 66 serves a dual purpose by illuminating the seconds and minutes photo sensors and the bulb 65 is used to illuminate the hours photo sensors.

The photo sensors are placed in fixed locations looking at the light bulbs 65 and 66 through the code logic holes. Light will shine on a photo sensor only when a hole in one of the readout discs registers with a hole in the corresponding code discs. No two code sensors can be illuminated at the same time since the code bit spacing is accomplished with the strobe action of the readout discs. One photo sensor is required for each code bit. Two additional sensors are used to provide a frame indication each 15 seconds and a 1 second position indicator each second in case a code bit is not present. The presence of a code bit is indicated by a wider pulse than the 1 second position indicator thereby giving a code pulse readout at the appropriate times.

Electronic logic circuitry is required to convert the information from the code discs and photo circuitry to the desired serial code output. FIG. 5 shows the basic logic modules required for the desired code output.

The code diodes all operate in parallel without conflict since no two code diodes can ever be illuminated at the same time. The reference marker diode 10, the "0" digit diode 7 and the parallel code diodes each are connected to individual emitter follower cascades 70, 71 and 72, respectively. The photodiodes have a very high impedance when subjected to low light intensity and in this condition the emitter followers 70, 71 and 72 are essentially biased "off," having an output close to zero volts. When intense light illuminates any photodiode, the emitter follower to which it is connected is biased "on" and the output voltage goes to approximately the supply voltage of −12 volts.

The primary function of each emitter follower is to serve as an impedance matching stage between the photodiodes and the Schmitt trigger circuits 73, 74 and 75 which they control. Upon impulse from a photodiode, the corresponding trigger circuit will produce an output voltage and hold it until the input drops below the required threshold voltage for the trigger. One advantage of the Schmitt trigger is that the output switches in a very short time compared to the input voltage waveform and therefore provides the necessary fast rise time pulse.

The Schmitt trigger circuits 73, 74 and 75 are connected to one-shot multivibrators 76, 77 and 78, respectively. The multivibrators provide the necessary pulse widths of 300 ms., 160 ms., and 60 ms. for the code reference, digit, and zero pulses, respectively. The code discs and photodiodes determine the time when each pulse is to occur.

The output of the one-shot multivibrators 76, 77 and 78 are combined in a logic "or" gate 80, as indicated in FIG. 5. The output of each multivibrator goes through the gate 80 and a following emitter follower 81 with no change in amplitude and the serial code is available at the output 82 at a good low impedance level.

As previously mentioned, the code described was selected by way of example and is not required by the invention. The code may be changed by merely replacing the code discs with discs bearing a different code.

Obviously, many modifications and variations of the present invention are possible in the light of the above teachings. It is therefore to be understood that within the scope of the appended claims the invention may be practiced otherwise than as specifically described.

What is claimed is:

1. A time code generator comprising
a plurality of code means each containing a plurality of coded apertures,
a motor connected to said plurality of code means for effecting rotation thereof,
light means for illuminating the apertures in said plurality of code means,
a plurality of light sensors mounted adjacent to said plurality of code means for detecting the passage of illuminated apertures as the plurality of code means is rotated, and means associated with said plurality of code means and said light means for strobing the light applied to said apertures so that only one aperture in each of said code means will be illuminated at a given time.

2. A time code generator comprising
a plurality of apertured coaxial discs,
a synchronous motor connected to said discs for rotating said discs,
light means for illuminating the apertures in said discs,
a plurality of light sensors mounted adjacent to said discs for detecting the passage of illuminated apertures as the discs are rotated, and
means located adjacent said discs for strobing the light applied to said apertures so that not more than one aperture in each of said code discs will be illuminated at a given time.

3. A time code generator as defined in claim 2 and additionally comprising
a plurality of amplifiers having said light sensors connected in control thereof, and
means for combining the signal from each amplifier into a common output.

4. A time code generator comprising
a motor,
a first code disc rotated by said motor and containing a plurality of apertures designating a first unit of time in a coded manner,
a second code disc rotated in response to said first code disc and containing a plurality of apertures designating a second unit of time in a coded manner,
a third code disc rotated in response to said second code disc and containing a plurality of apertures designating a third unit of time in a coded manner,
a readout disc associated with each code disc, each readout disc containing a plurality of apertures arranged to strobe the apertures in its associated code disc,
light means for illuminating the apertures in said code discs through the apertures in said readout discs so that not more than one of the apertures in each of said code discs will be read out at a time, and
a plurality of light sensors mounted adjacent to each code disc for detecting the passage of illuminated apertures as the code discs are rotated.

5. A time code generator as defined in claim 4 which additionally comprises
a plurality of transistor emitter fololwers having said light sensors connected in control thereof,
a switching means connected in the output of each emitter follower, and
a gate having the output of all of the switching means connected thereto so that signals from the light sensors are combined at a single output.

6. A time code generator comprising
a motor,
a first set of discs rotated by said motor and containing apertures therein,
a second, third and fourth discs associated with said first set of discs and also containing apertrues therein, said second, third and fourth discs each being strobed by one of said first set of discs so that not more than one aperture in each of said second, third and fourth discs will be aligned with apertures in said first set of discs at any given time,
a first cam and first switch associated with said second disc for driving said third disc in response to rotation of said second disc,
a second cam and second switch associated with said third disc for driving said fourth disc in response to rotation of said third disc,
photodiode means associated with each set of discs for detecting rotation of said discs, and
means for combining the signals from the photodiode means into a single output.

7. A time code generator as defined in claim 6 wherein, the apertures in said first set of discs are spaced on said discs so as to represent units of time in binary code.

8. A time code generator comprising
a plurality of apertured coaxial discs for generating time coded pulses,
a synchronous motor connected to said discs for rotating said discs,
light means for illuminating the apertures in said discs,
a plurality of light sensors mounted adjacent said discs for detecting the passage of illuminated apertures as the discs are rotated,
means associated with said discs and said light means for strobing the light applied to said apertures so that not more than one aperture in each of said discs will be illuminated at a time, and
means cooperable with said discs for providing output pulses in phase with said time coded pulses whenever said time coded pulses fail to occur.

9. A time code generator comprising
a motor,
a first set of discs rotated by said motor and containing apertures therein,
second, third and fourth discs containing apertures therein and cooperable with said first set of discs for generating time coded pulses,
pulse fill-in means cooperable with said first set of discs and said second, third and fourth discs for providing output pulses in phase with said time coded pulses whenever said time coded pulses fail to occur,
a first cam and first switch associated with said second disc for driving said third disc in response to rotation of said second disc,
a second cam and second switch associated with said third disc for driving said fourth disc in response to rotation of said third disc,
photodiode means associated with each set of discs for detecting rotation of said discs, and
means for combining the signals from the photodiode means into a single output.

10. A time code generator comprising
a plurality of apertured coaxial discs,
a synchronous motor connected to said discs for rotating said discs,
light means for continuously illuminating apertures in said discs,
a plurality of light sensors mounted adjacent said discs for detecting the passage of illuminated apertures as the discs are rotated,
a plurality of amplifiers having said light sensors connected in control thereof,
means for combining the signal from each amplifier into a common output, and
means located adjacent said discs for strobing the light applied to said apertures so that not more than one aperture in each of said discs will be illuminated at a time.

References Cited by the Examiner

UNITED STATES PATENTS

| | | | |
|---|---|---|---|
| 2,747,797 | 5/1956 | Beaumont | 340—347 |
| 2,953,777 | 9/1960 | Gridley | 340—347 |
| 3,122,735 | 2/1964 | Townsend | 340—347 |

MALCOLM A. MORRISON, *Primary Examiner.*

K. R. STEVENS, *Assistant Examiner.*